United States Patent
Manning et al.

(10) Patent No.: US 8,683,042 B1
(45) Date of Patent: Mar. 25, 2014

(54) MAINTAINING POLICY TRAFFIC STATISTICS OVER MULTIPLE SESSIONS

(75) Inventors: Serge M. Manning, Overland Park, KS (US); Bejoy Pankajakshan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 12/954,123

(22) Filed: Nov. 24, 2010

(51) Int. Cl.
*G06F 15/173* (2006.01)
*H04M 11/00* (2006.01)

(52) U.S. Cl.
USPC .......................................... 709/226; 455/406

(58) Field of Classification Search
USPC ............................ 709/223–229; 455/405–408
See application file for complete search history.

(56) References Cited

U.S. PATENT DOCUMENTS

| | | | |
|---|---|---|---|
| 8,112,062 B2 * | 2/2012 | Pattabiraman | 455/405 |
| 2007/0260562 A1 * | 11/2007 | Hutson et al. | 705/412 |
| 2011/0151831 A1 * | 6/2011 | Pattabiraman | 455/405 |
| 2011/0275344 A1 * | 11/2011 | Momtahan et al. | 455/405 |

* cited by examiner

*Primary Examiner* — Brendan Higa (57) ABSTRACT

Methods, systems, and computer-readable media are provided for determining cumulative data usage information associated with a mobile device. In particular, a request to initiate a communication session is received from a mobile device. Accordingly, allocated data usage information associated with the mobile device is retrieved from a subscription profile server. Based on the allocated data usage information, a gateway facilitating a communication session with the mobile device is provided with a threshold amount of data usage information. After the communication session has ended, data usage information from the communication session is used to calculate updated data usage information associated with the mobile device. The updated data usage information is then stored at the subscription information server.

18 Claims, 7 Drawing Sheets

MAINTAINING POLICY TRAFFIC STATISTICS OVER MULTIPLE SESSIONS

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

As users of mobile devices become increasingly active, it is becoming valuable for network service providers to be more vigilant in tracking the extent to which users utilize their mobile devices. In particular, it is increasingly valuable for network service providers to become aware when a user exceeds his allotted data usage. Accordingly, it is desirable to track cumulative data usage associated with a mobile device across multiple sessions.

In a first aspect, a set of computer-useable instructions provide a method of determining cumulative data usage information associated with a mobile device. The method comprises receiving a request from a first mobile device to initiate a communication session. The method also comprises retrieving data usage information associated with the first mobile device from a subscription profile server. Additionally, the method comprises providing a threshold amount of data usage information associated with the first mobile device to a gateway facilitating the communication session. The method also comprises receiving data usage information of the communication session from the gateway after the communication session has ended. Further, the method comprises calculating updated data usage information associated with the mobile device based on the data usage information of the communication session. The method also comprises providing the updated data usage information to the subscription profile server.

In a second aspect, a set of computer-useable instructions provide a method of determining cumulative data usage information associated with a mobile device. The method comprises receiving a request for data usage information associated with a first mobile device from a session manager. The method also comprises providing allocated data usage information associated with the first mobile device to the session manager. Additionally, the method comprises receiving updated data usage information from the session manager based on data usage information of a communication session between the first mobile device and a second mobile device. Further, the method comprises storing the updated data usage information to a profile of the first mobile device at the subscription profile server.

In a third aspect, a set of computer-useable instructions provide a method of determining cumulative data usage information associated with a mobile device. The method comprises receiving a first request from a first mobile device to initiate a first communication session. The method also comprises retrieving data usage information associated with the first mobile device from a subscription profile server. Additionally, the method comprises providing the data usage information associated with the first mobile device to a gateway facilitating the first communication session. The method also comprises receiving data usage information of the first communication session from the gateway after the communication session has ended. Further, the method comprises calculating updated data usage information associated with the mobile device based on the data usage information of the first communication session. The method also comprises providing the updated data usage information to the subscription profile server. Additionally, the method comprises receiving a second request from a second mobile device to initiate a second communication session. The method also comprises retrieving the updated data usage information associated with the first mobile device from the subscription profile server.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The data on the media can be stored momentarily, temporarily, or permanently.

In some embodiments, systems, methods, and computer-readable media for determining cumulative data usage of a mobile device are provided. In particular, claimed embodiments of the present invention retrieve a data allocation associated with a mobile device and adjust the data allocation based on a communication session of the mobile device. The adjusted data allocation is then stored in association with the mobile device. For example, the adjusted data allocation may be stored at a subscription profile server.

Many mobile device data plans limit the amount of data accessed by the mobile device over a predetermined period of time. Additionally or alternatively, many mobile device voice plans limit the amount of time a mobile device voice plans may limit the amount of time a mobile device may participate in a particular type of call. In both cases, the penalty for exceeding a data usage or call duration limit may comprise additional fees that provide revenue to a network service provider. Accordingly, it is in the best interest for network service providers to have accurate and updated information related to the data usage and/or call duration information associated with a mobile device.

Currently, allocated data usage information associated with a mobile device may be stored at a server, such as a subscription profile server. In particular, allocate data usage information comprises data usage information that is allocated to a mobile device for a period of time. For example, a subscription profile server may store information of data usage that is allocated to mobile devices based on data plans of the mobile devices. For instance, a first mobile device may subscribe to a data plan that allows the mobile device to download 1 gigabyte (GB) of data every month. Accordingly, the allocated data usage of 1 GB/month may be stored at the subscription profile server in association with the first mobile device.

The allocated data usage information associated with the first mobile device may be retrieved in response to a query received at the subscription profile server from a session manager. For instance, the session manager may request allocated data information associated with the first mobile device from a subscription profile server in order to determine the amount of data that the first mobile device may download during a communication session. Further, the session manager may provide a gateway facilitating the communication session with a threshold amount of data usage based on the allocated data usage information received from the subscription profile server. In particular, the threshold amount of data usage provided from the session manager comprises the amount of data that may be transmitted during the communication session before the first mobile device exceeds its allocated data usage for a period of time.

Once the threshold has been set, the gateway may monitor the data usage of the communication session. In one example, the communication session may end before the threshold amount of data has been transmitted. In this example, the gateway may provide the data usage information to the session manager. In particular, the data usage information may comprise the amount of data that was transmitted during the communication session. Alternatively, the data usage information may comprise the amount of data that was downloaded to the first mobile device during the communication session. Once the session manager has received the data usage information from the gateway, the session manager may calculate adjusted allocated data usage information associated with the mobile device. In particular, the session manager may subtract the data usage information of the communication session from the allocated data usage information of the mobile device.

As such, the session manager may calculate adjusted data usage information comprising the cumulative data usage information associated with the mobile device. The session manager may then provide the adjusted data usage information to the subscription profile server. At the subscription profile server, the adjusted data usage information may be stored in association with a profile of the mobile device. In particular, the adjusted data usage information may be stored in an area of the profile of the mobile device that is separate from the area of the profile of the mobile device that stores the allocated data usage information.

In another example, the threshold amount of data may be transmitted during the communication session. The threshold amount of data may comprise the allocated data usage information. In this case, the gateway may inform the session manager that the threshold has been met, and the session manager may instruct the gateway to terminate the communication session.

Alternatively, the threshold amount of data may comprise a percentage of the allocated data usage information. In this alternative case, the gateway may inform the session manager that the threshold has been met, and the session manager may initiate a process of requesting additional funds while the gateway continues to monitor the data transmitted during the communication session.

In either case, the session manager may inform the subscription profile server that mobile device has reached or is about to reach its allocated data usage. Accordingly, the subscription profile server may instruct a web page to request that a user of the mobile device purchase additional data allocation so that the communication session may continue.

Figure 1:
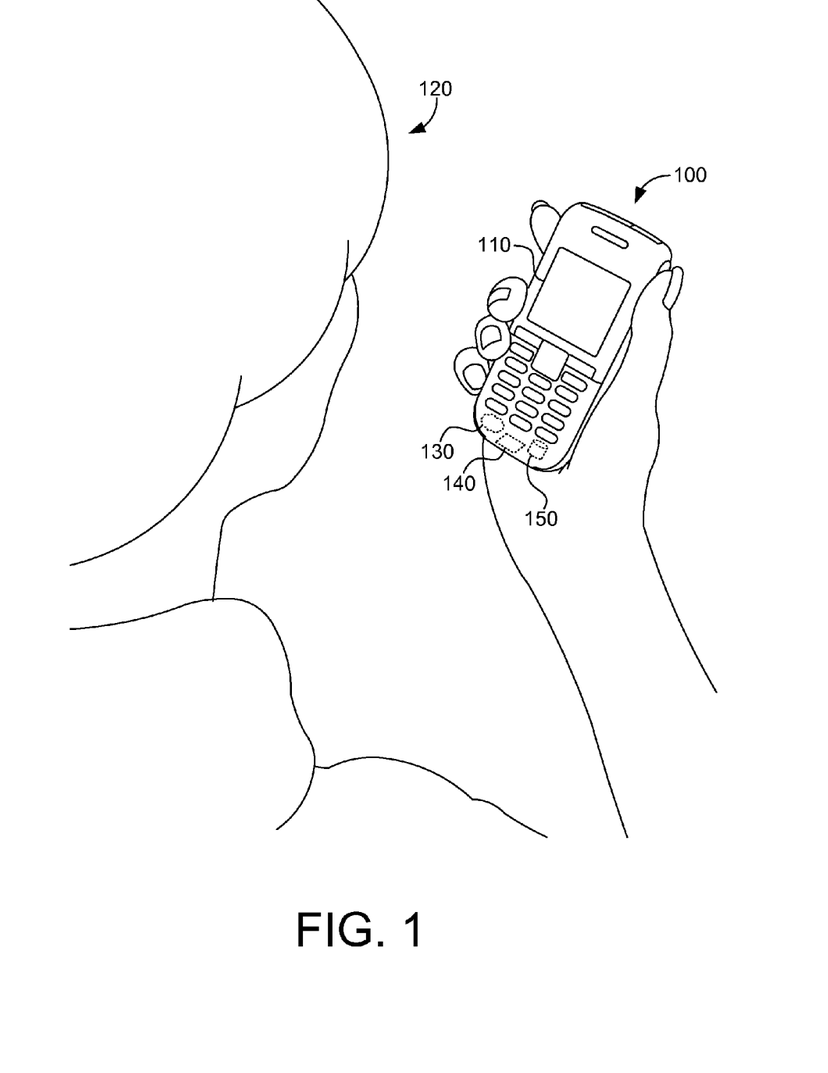
FIG. 1 is an illustrative mobile device, in accordance with an embodiment of the present invention.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a user interface 110, a user 120, application 130, memory 140, and data structure 150. Generally, user interface 110 provides an input/output (I/O) interface that user 120 may engage to interact with device 100. For example, user interface 110 may include a touch screen that a user may scratch or touch to interact with device 100. This interaction may include initiating a communication session.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

Device 100 may also include application 130, memory 140, and data structure 150. Application 130 may carry out various functional aspects and might take on a variety of forms. For example, application 130 might include configuration settings, might facilitate communicating data between multiple devices, might handle updates, include user settings, etc. Specifically, application 130 may be used to implement a method for protecting the viewability of desired image portions presented on user interface 110 of mobile device 100. For example, application 130 may be used to interaction with other mobile devices via a communication session. Alternatively, application 130 may be used by a user to manage an account associated with the mobile device.

Memory 140 may include a data structure 150 that stores and facilitates the operation of application 130. For example, memory 140 may store data relating to an image and/or information displayed on user interface 110, as well as information related to the selected image portions. In addition, memory 140 may store firmware and other various software modules and components that might be present in mobile device 100. These modules and components may be used in embodiments of the present invention to protect the viewability of desired image portions presented on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
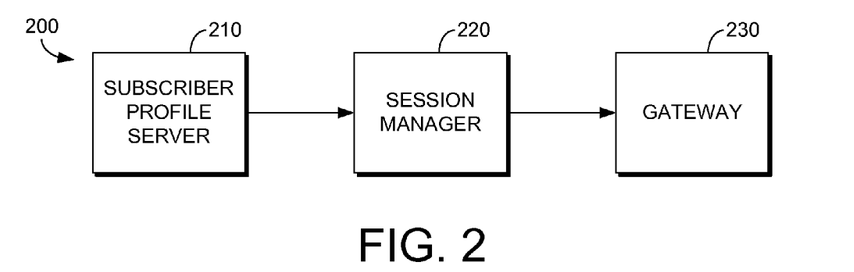
FIG. 2 is a schematic diagram of an illustrative system used to determine cumulative data usage information associated with a mobile device, in accordance with an embodiment of the present invention.

FIG. 2 is a schematic diagram 200 of an illustrative system used to determine cumulative data usage information associated with a mobile device, in accordance with an embodiment of the present invention. The system 200 comprises subscription profile server 210, session manager 220, and gateway 230. Subscription profile server 210 stores data usage information associated with mobile devices. In particular, subscription profile server 210 may store allocated data usage information associated with mobile devices based on data plans subscriptions of the mobile devices.

Further, in accordance with embodiments of the present invention, subscription profile server 210 may additionally store cumulative data usage information associated with mobile devices. In particular, subscription profile server 210 may store cumulative data usage information during a subscription time period that is the basis of the periodic subscription allocation. For example, the subscription profile server may store cumulative data usage information during a month of time when a subscription is based on a month-to-month basis.

Session manager 220 provides gateway 230 with instructions to facilitate a communication session between mobile devices. In particular, session manager 220 provides gateway 230 with a threshold amount of data usage information that may be communicated during the communication session. Additionally, session manager 220 calculates adjusted allocated data usage information associated with the mobile device. Further, session manager 220 provides the updated data usage information to subscription profile server 210.

Figure 3:
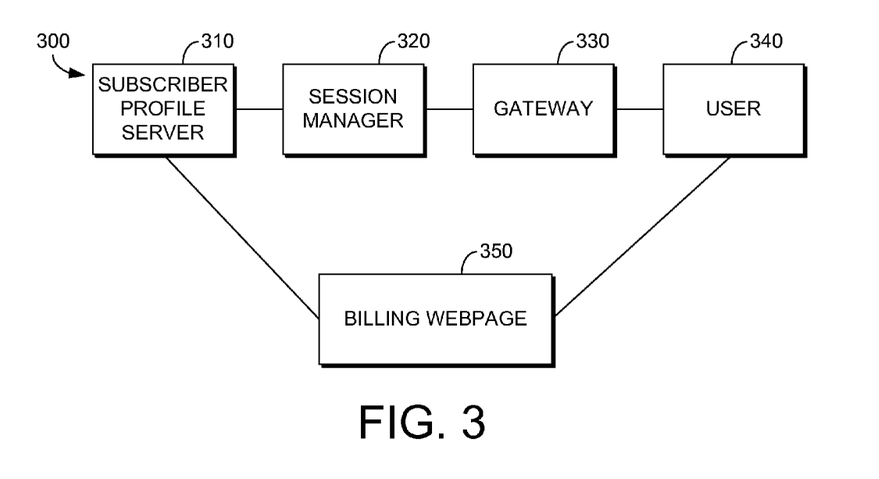
FIG. 3 is another schematic diagram of an illustrative system used to determine cumulative data usage information associated with a mobile device, in accordance with an embodiment of the present invention.

FIG. 3 is another schematic diagram 300 of an illustrative system used to determine cumulative data usage information associated with a mobile device, in accordance with an embodiment of the present invention. The system comprises subscription profile server 310, session manager 320, gateway 330, user 340, and billing webpage 350. Similar to subscription profile server 210, subscription profile server 210 stores data usage information associated with mobile devices. In particular, subscription profile server 310 may store allocated data usage information associated with mobile devices based on data plans subscriptions of the mobile devices.

Further, in accordance with embodiments of the present invention, subscription profile server 310 may additionally store updated cumulative data usage information associated with mobile devices. In particular, subscription profile server 310 may store cumulative data usage information during a subscription time period that is the basis of the periodic subscription allocation. For example, the subscription profile server may store cumulative data usage information during a month of time when a subscription is based on a month-to-month basis. When cumulative data usage information is calculated based on data usage information that is updated based on data transmitted through during a communication session, the cumulative data usage information may be referred to as updated data usage information.

Session manager 320 provides gateway 330 with instructions to facilitate a communication session between mobile devices. In particular, session manager 320 provides gateway 330 with a threshold amount of data usage information that may be communicated during the communication session. Additionally, session manager 320 calculates updated data usage information associated with the mobile device. Further, session manager 320 provides the updated data usage information to subscription profile server 310.

User 340 is associated with a mobile device, such as a mobile device described in FIG. 1. In particular, when gateway 330 has determined that the mobile device of user 340 has met its allocated data usage for a subscription period, user 340 may interact with the mobile device to access billing webpage 350. Billing webpage 350 allows user 340 to increase the allocated data usage for the mobile device associated with user 340 within a period of time.

Figure 4:
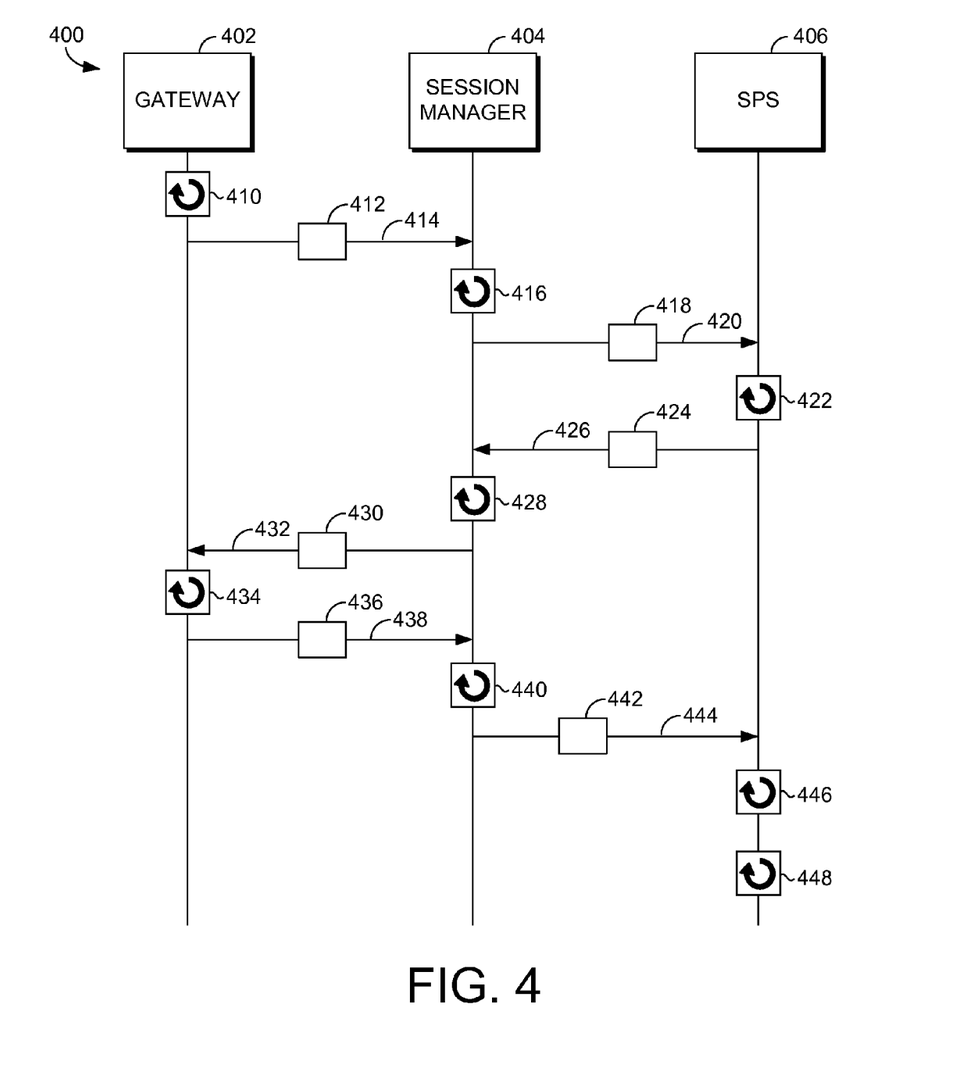
FIG. 4 is a process flow diagram showing an embodiment of a method of determining cumulative data usage information associated with a mobile device, in accordance with an embodiment of the present invention.

FIG. 4 is a process flow diagram 400 showing an embodiment of a method of determining cumulative data usage information associated with a mobile device, in accordance with an embodiment of the present invention. In particular, FIG. 4 provides flow diagram 400 for adjusting data usage allocation associated with a mobile device based on a communication session involving the mobile device. Initially, a request 412 to initiate a communication session is generated 410 at gateway 402 based on interaction of gateway 402 with the mobile device. The request 412 is sent 414 to session manager 404. Session manager may comprise a policy charging and rules function.

At session manager 404, a data usage request 418 is generated 416. In particular, data usage request 418 comprises a request for a data usage allocation associated with a mobile device. The data usage request 418 is sent 420 to a subscription profile server (SPS) 406. Subscription profile server 406 includes data usage information associated with the mobile device. Accordingly, subscription profile server 406 generates 422 a response 424 that includes the data usage information associated with the mobile device. Additionally, response 424 is sent 426 to session manager 404.

At session manager 404, a data usage threshold 430 is generated 428. Data usage threshold 430 is based on the data usage information within response 424. Additionally, data usage threshold 430 is provided 432 to gateway 402. At gateway 402, a communication session associated with the mobile device is facilitated. Further, the communication session is limited by data usage threshold 430. When the communication session ends before data usage threshold 430 has been met, gateway 402 generates 434 a notification 436 that the communication session has ended. The notification 436 includes data usage information associated with the communication session. Notification 436 is then sent 438 to session manager 404.

Once session manager 404 receives notification 436, session manager 404 calculates 440 adjusted data usage information 442 associated with the mobile device. In particular, the adjusted data usage information 442 is calculated 440 based on the data usage information associated with the communication session. The adjusted data usage information 442 is then provided 444 to subscription profile server 406. At subscription profile server 406, the profile of the mobile device is updated 446 to include a portion to store cumulative data usage information. Further, at subscription profile server 406, adjusted data usage information 442 is stored 448 at the profile associated with the mobile device.

Figure 5:
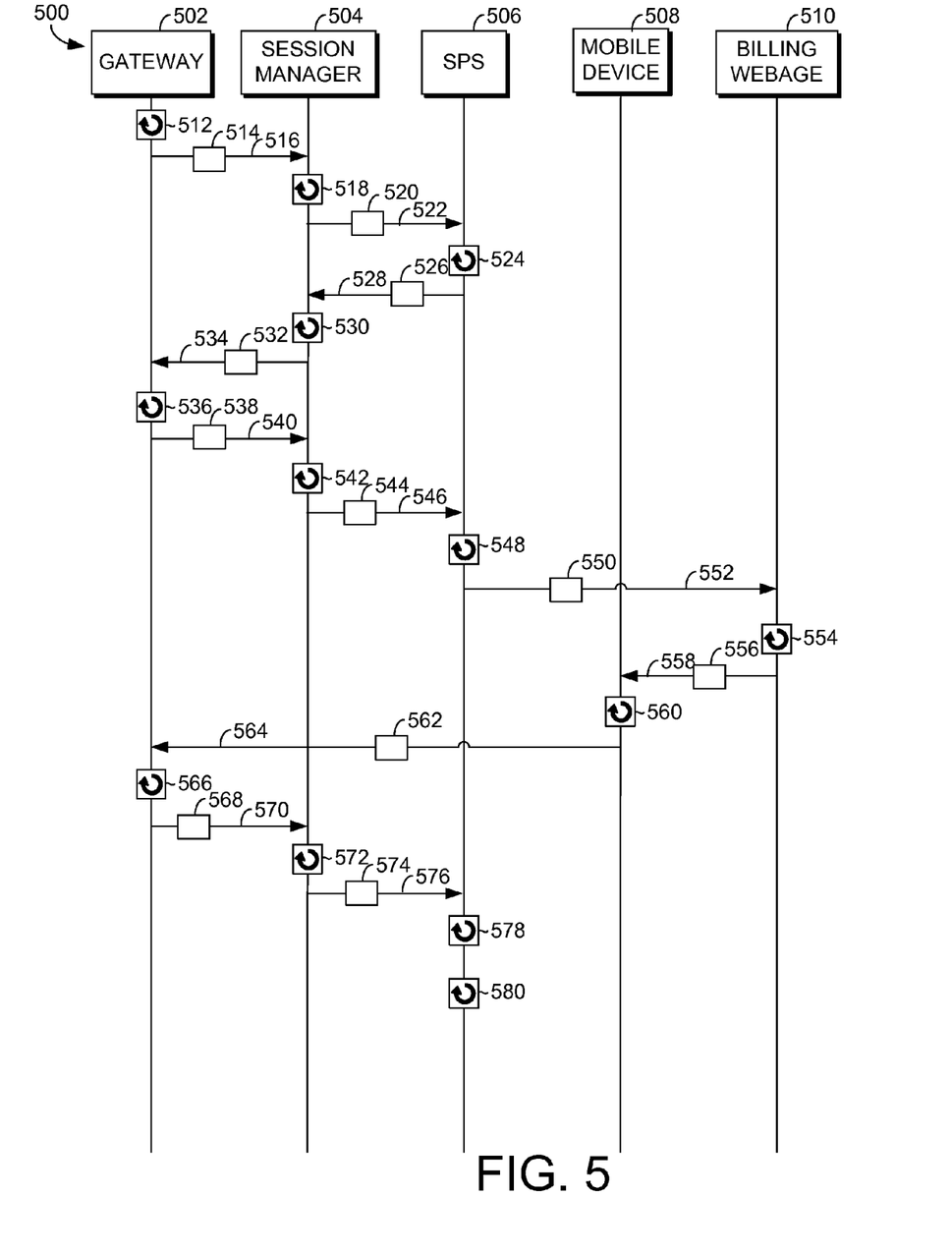
FIG. 5 is another process flow diagram showing an embodiment of a method of determining cumulative data usage information associated with a mobile device, in accordance with an embodiment of the present invention.

FIG. 5 is another process flow diagram 500 showing an embodiment of a method of determining cumulative data usage information associated with a mobile device, in accordance with an embodiment of the present invention. In particular, FIG. 5 provides flow diagram 500 for adjusting data usage allocation associated with a mobile device based on a communication session involving the mobile device. Initially, a request 514 to initiate a communication session is generated 512 at gateway 502 based on interaction of gateway 502 with the mobile device. The request 514 is sent 516 to session manager 504. Session manager 504 may comprise a policy charging and rules function.

At session manager 504, a data usage request 520 is generated 518. In particular, data usage request 520 comprises a request for a data usage allocation associated with a mobile device. The data usage request 520 is sent 522 to subscription profile server (SPS) 506. Subscription profile server 506 includes data usage information associated with the mobile device. Accordingly, subscription profile server 506 generates 524 a response 526 that includes the data usage information associated with the mobile device. Additionally, response 526 is sent 528 to session manager 504.

At session manager 504, a data usage threshold 532 is generated 530. Data usage threshold 532 is based on the data usage information within response 526. In particular, data usage threshold 532 may comprise the data usage information within response 526. Alternatively, data usage threshold 532 may comprise a percentage of the data usage information within response 526. Data usage threshold 532 is provided 534 to gateway 502. At gateway 502, a communication session associated with the mobile device is facilitated. Further, the communication session is limited by data usage threshold 532. When the data used throughout the communication session meets data usage threshold 532, gateway 502 generates 536 a notification 538 that includes information that data usage threshold 532 has been met. Notification 538 is sent 540 to session manager 504.

Once notification 538 has been received at session manager 504, session manager 504 generates 542 a notification 544 that the allocated data usage of mobile device 508 has been met. The notification 544 is sent 546 to subscription profile server 506. At subscription profile server 506, billing request 550 is generated 548. In particular, billing request 550 comprises a request to provide mobile device 508 an advertisement to pay for an increased data usage allocation. Billing request 550 is sent 552 to billing webpage 510. In response to receiving billing request 550, billing webpage generates 554 an advertisement 556 to present to mobile device 508. In particular, the advertisement 556 offers to increase the allocated data usage for mobile device 508. The advertisement 556 is sent 558 to mobile device 508.

At 560, mobile device 508 generates a response 562 to increase the allocated data usage associated with mobile device 508. Further, response 562 is sent 564 to gateway 502. At 566, gateway 502 generates a notification 568 that mobile device 508 has increased the allocated data usage associated with mobile device 508. Additionally, notification 568 is sent 570 to session manager 504. Session manager 504 calculates 572 adjusted data usage information 574 and sends 576 adjusted data usage information 574 to subscription profile server 506. At subscription profile server 506, the profile of mobile device 508 is updated 578 to include a portion to store cumulative data usage information. Further, at subscription profile server 506, adjusted data usage information 574 is stored 580 at the profile associated with the mobile device.

Figure 6:
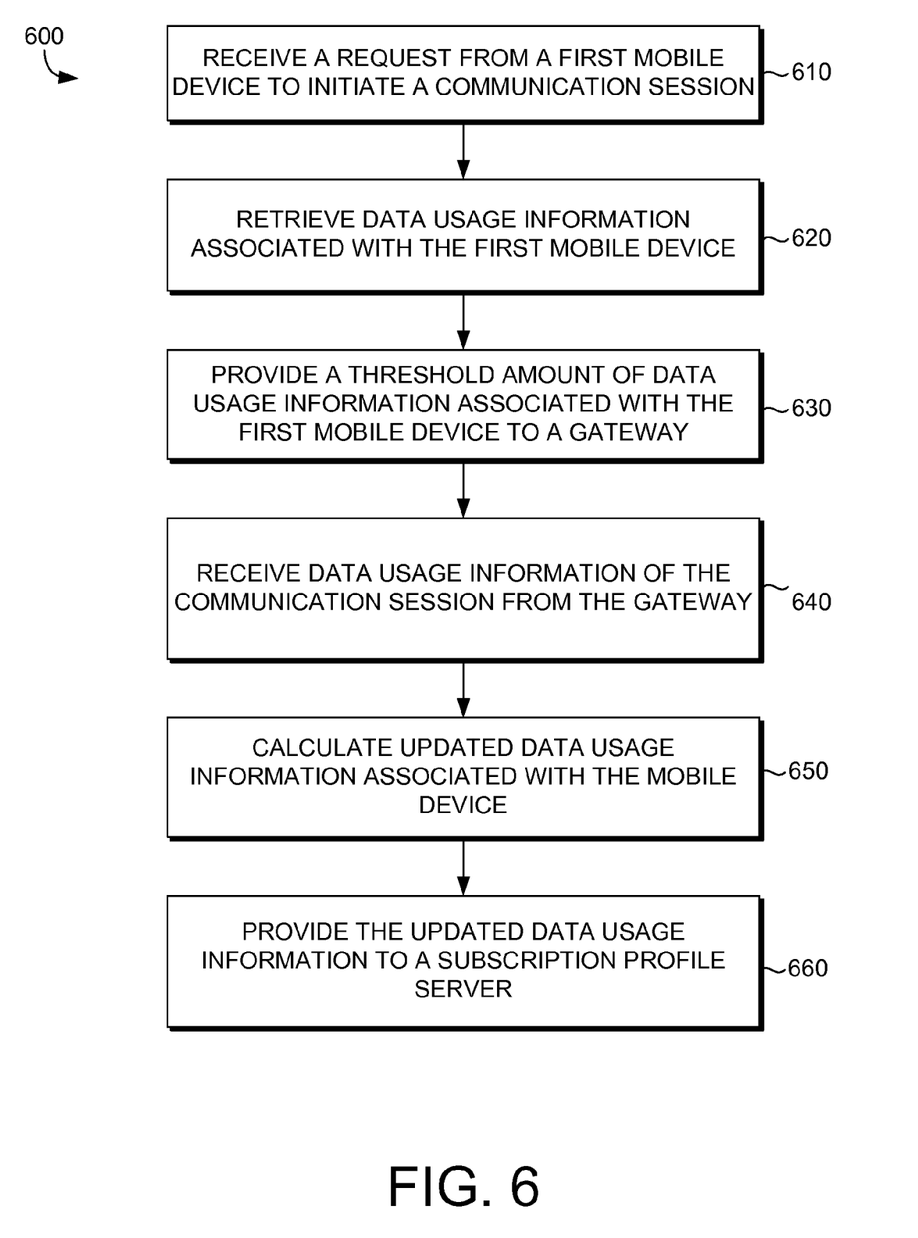
FIG. 6 is a flow diagram showing an embodiment of a method of determining cumulative data usage information associated with a mobile device, in accordance with an embodiment of the present invention.

FIG. 6 is a flow diagram 600 showing an embodiment of a method of determining cumulative data usage information associated with a mobile device, in accordance with an embodiment of the present invention. At block 610, a request from a first mobile device is received to initiate a communication session. At block 620, data usage information associated with the first mobile device is retrieved from a subscription profile server.

At block 630, a threshold amount of data usage information associated with the first mobile device is provided to a gateway facilitating the communication session. The threshold amount of data usage information may be based on the data usage information associated with the first mobile device. In particular, the threshold amount of data usage information may comprise the data usage information associated with the first mobile device. Alternatively, the threshold amount of data usage information may comprise a percentage of the data usage information associated with the first mobile device.

At block 640, data usage information of the communication session is received from the gateway after the communication session has ended. The communication session may end prior to the threshold being met. In this case, the data usage information of the communication session is less than the allocated data usage information associated with the first mobile device during a subscription period. Additionally, at block 650, updated data usage information associated with the mobile device is calculated based on the data usage information of the communication session. The updated data usage information associated with the mobile device may be calculated based on a duration of the communication session.

At block 660, the updated data usage information is provided to the subscription profile server. The updated data usage information provided to the subscription profile server may be stored in association with a profile of the first mobile device. In particular, the updated data usage information may be stored in an area of the profile of the first mobile device that is separate from an area that stores allocated data usage information of the first mobile device. Alternatively, the communication session may end when the threshold has been met. In this case, the gateway may provide a notification to a session manager that the communication session has ended. Further, the session manager may instruct the gateway to terminate the communication session.

Figure 7:
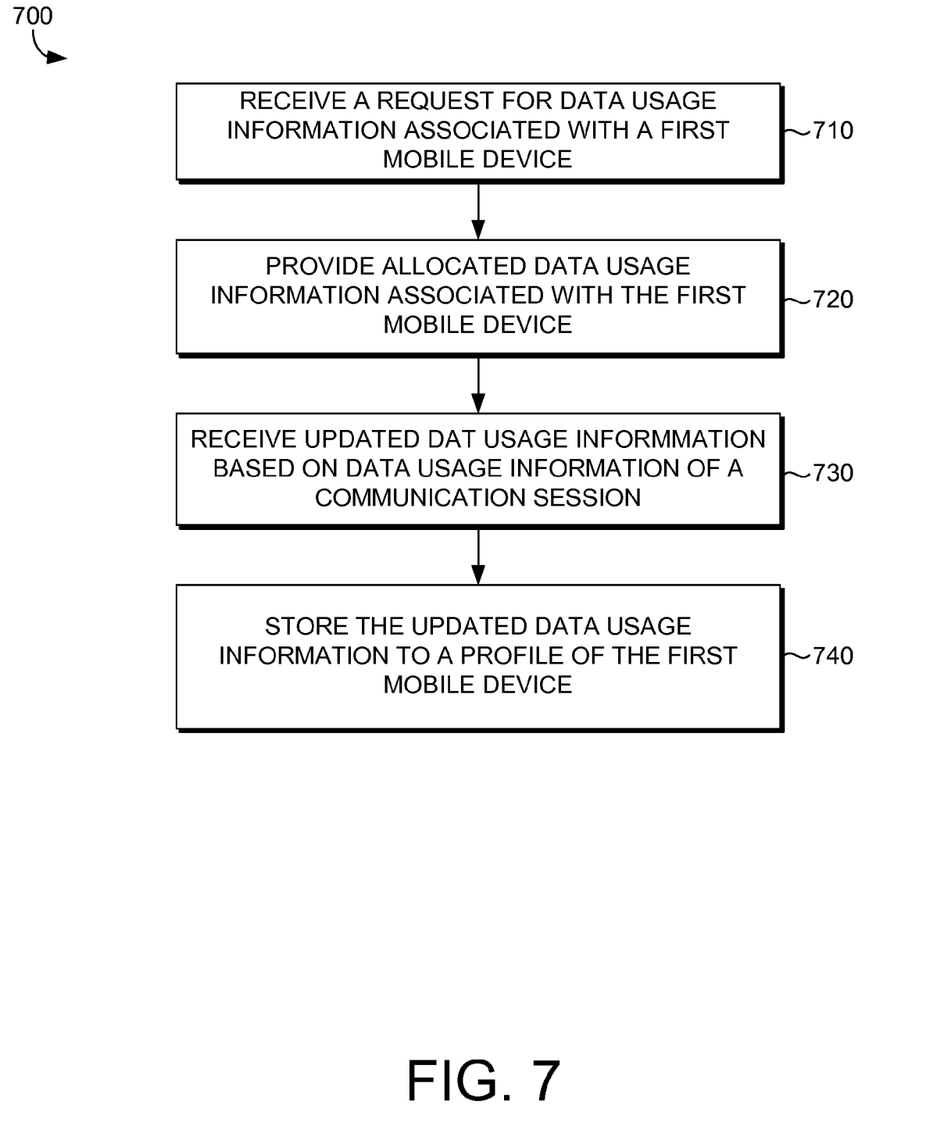
FIG. 7 is a flow diagram showing an embodiment of a method of determining cumulative data usage information associated with a mobile device, in accordance with an embodiment of the present invention.

FIG. 7 is a flow diagram 700 showing an embodiment of a method of determining cumulative data usage information associated with a mobile device, in accordance with an embodiment of the present invention. At block 710, a request for data usage information associated with a first mobile device is received from a session manager. The session manager may comprise a policy charging and rules function. At block 720, allocated data usage information associated with the first mobile device is provided to the session manager. In particular, the allocated data usage information associated with the first mobile device is provided when there is no updated usage information stored in the profile of the first mobile device.

At block 730, updated data usage information is received from the session manager based on data usage information of a communication session between the first mobile device and a second mobile device. The updated usage information may be associated with a subscription period. At block 740, the updated data usage information is stored to a profile of the first mobile device at the subscription profile server. The allocated data usage information may be stored in a first portion of the profile of the first mobile device at the subscription profile server. Additionally, the updated data usage information may be stored in a second portion of the profile of the first mobile device of the subscription profile server. Further, the allocated data usage information may be stored separately from the updated data usage information.

Figure 8:
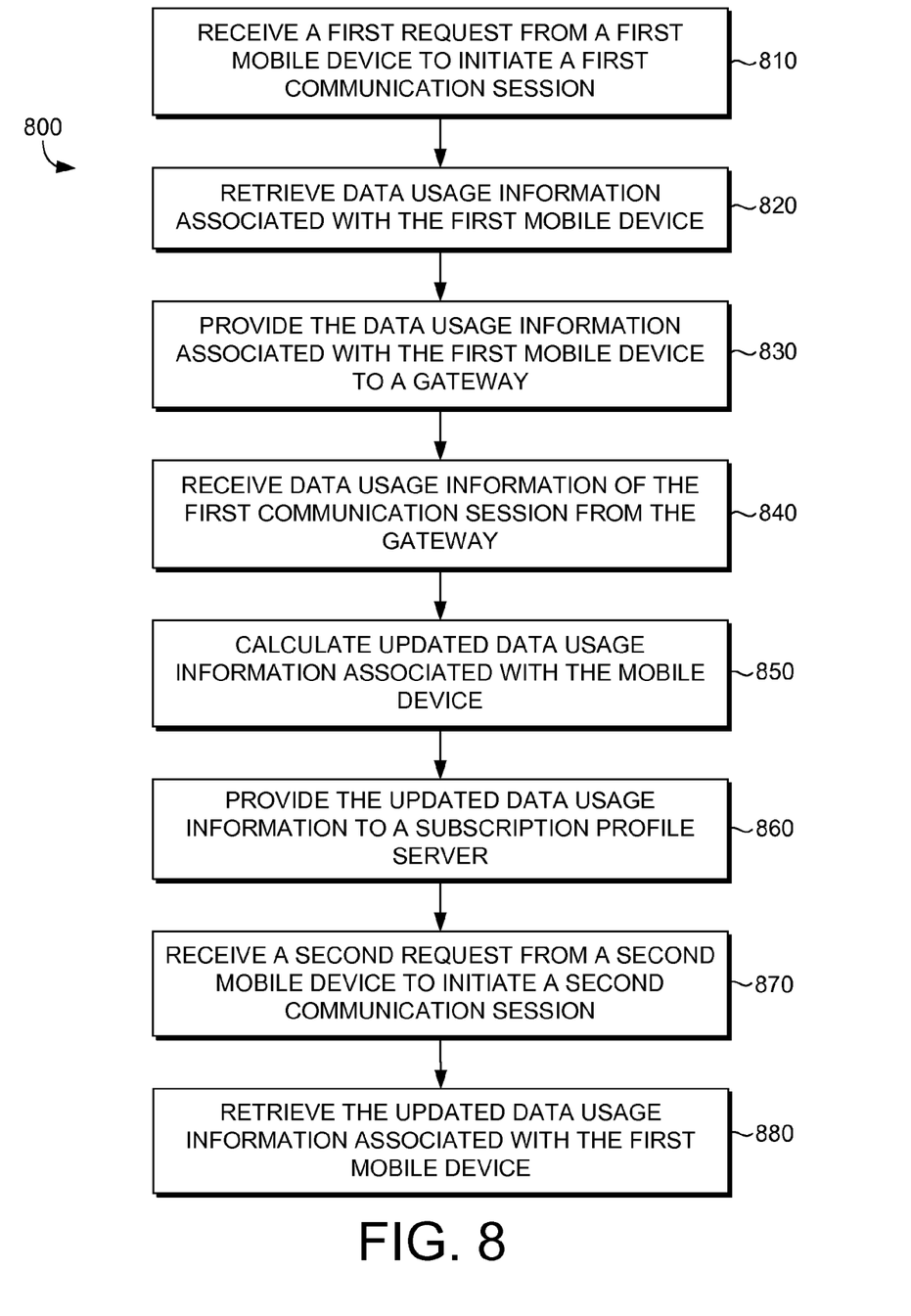
FIG. 8 is a flow diagram showing an embodiment of a method of determining cumulative data usage information associated with a mobile device, in accordance with an embodiment of the present invention.

FIG. 8 is a flow diagram 800 showing an embodiment of a method of determining cumulative data usage information associated with a mobile device, in accordance with an embodiment of the present invention. At block 810, a first request from a first mobile device is received to initiate a first communication session. At block 820, data usage information associated with the first mobile device is retrieved from a subscription profile server.

At block 830, the data usage information associated with the first mobile device is provided to a gateway facilitating the first communication session. At block 840, data usage information of the first communication session is received from the gateway after the communication session has ended. At block 850, updated data usage information associated with the mobile device is calculated based on the data usage information of the first communication session. The updated data usage information may be calculated based on a duration of the first communication session. Additionally, the updated usage information may be associated with a subscription period.

At block 860, the updated data usage information is provided to the subscription profile server. In particular, the subscription profile server may store the updated usage information in a profile of the first mobile device. At block 870, a second request is received from a second mobile device to initiate a second communication session. Additionally, the updated data usage information associated with the first mobile device is retrieved from the subscription profile server.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of determining cumulative data usage information associated with a mobile device, the method comprising:

receiving, at a session manager, a request from a first mobile device to initiate a communication session;

retrieving, at the session manager, data usage information associated with the first mobile device from a subscription profile server;

providing, at the session manager, a threshold amount of data usage information associated with the first mobile device to a gateway facilitating the communication session;

receiving, at the session manager, data usage information of the communication session from the gateway after the communication session has ended;

calculating, at the session manager, updated data usage information associated with the mobile device based on receiving data usage information of the communication session from the gateway;

providing, at the session manager, the updated data usage information to the subscription profile server, the updated data usage information being based on the data usage information of the communication session received from the gateway;

determining, at the session manager, based on the updated data usage information that the mobile device is within a threshold amount of using all of the data usage presently allocated to the mobile device;

sending, from the session manager, a billing request to a billing webpage comprising a request that an advertisement to pay for an increased data usage allocation be presented to the mobile device;

receiving, at the session manager, an indication that an additional data allocation has been purchased for the mobile device; and updating, at the session manager, an amount of data usage available to the mobile device to include the additional data allocation.

2. The method of claim 1, wherein the threshold amount of data usage information is based on the data usage information associated with the first mobile device.

3. The method of claim 2, wherein the threshold amount of data usage information comprises the data usage information associated with the first mobile device.

4. The method of claim 2, wherein the threshold amount of data usage information comprises a percentage of the data usage information associated with the first mobile device.

5. The method of claim 1, wherein the session manager comprises a policy charging and rules function.

6. The method of claim 1, wherein updated data usage information associated with the mobile device is calculated based on a duration of the communication session.

7. The method of claim 1, wherein the updated data usage information provided to the subscription profile server is stored in association with a profile of the first mobile device.

8. The method of claim 7, wherein the updated data usage information is stored in an area of the profile of the first mobile device that is separate from an area that stores allocated data usage information of the first mobile device.

9. The method of claim 1, wherein the communication session has ended when the threshold has been met.

10. Non-transitory computer-readable storage media ("media") having computer-executable instructions embodied thereon that, when executed, facilitate a method of determining cumulative data usage information associated with a mobile device, the method comprising:
   receiving, at a subscription profile manager, a request for data usage information associated with a mobile device from a session manager;
     providing, at the subscription profile manager, information associated with allocated data usage associated with the mobile device to the session manager;
     receiving updated data usage information from the session manager based on data usage information of a communication session between the first mobile device and a second mobile device;
     storing the updated data usage information to a profile of the first mobile device at the subscription profile server,
       wherein the allocated data usage information is stored in a first portion of the profile of the first mobile device at the subscription profile server, and
       wherein the updated data usage information is stored in a second portion of the profile of the first mobile device of the subscription profile server,
   receiving, at the subscription profile manager, a notification from the session manager that a threshold associated with the allocated data usage associated with the mobile device has been met;
   sending, at the subscription profile manager, a billing request to a billing webpage based on the notification from the session manager that the threshold associated with the allocated data usage associated with the mobile device has been met, the billing request comprising a request that an advertisement to pay for an increased data usage allocation be presented to the mobile device, wherein the increased data usage allocation is data usage that is in addition to the allocated data usage; and
   receiving, at the subscription profile manager, adjusted data usage information from the session manager, wherein the adjusted data usage information is calculated by the session manager based on the increased data usage allocation.

11. The media of claim 10, wherein the session manager comprises a policy charging and rules function.

12. The media of claim 10, the method further comprising storing, at the subscription profile manager, the adjusted data usage information at a profile associated with the mobile device.

13. The media of claim 10, wherein the allocated data usage information associated with the first mobile device is provided when there is no updated usage information stored in the profile of the first mobile device.

14. The media of claim 10, wherein the allocated data usage information is stored separately from the updated data usage information.

15. Non-transitory computer-readable storage media ("media") having computer-executable instructions embodied thereon that, when executed, facilitate a method of determining cumulative data usage information associated with a mobile device, the method comprising:
   receiving, at a session manager, a first request from a mobile device to initiate a communication session;
   retrieving, at the session manager, data usage information associated with the mobile device from a subscription profile server;
   providing, at the session manager, a threshold associated with the data usage information associated with the mobile device to a gateway facilitating the communication session;
   receiving, at the session manager, data usage information of the first communication session from the gateway after the communication session has ended;
   calculating, at the session manager, updated data usage information associated with the mobile device based on the data usage information of the first communication session;
   providing, at the session manager, the updated data usage information to the subscription profile server,
     wherein the allocated data usage information is stored in a first portion of the profile of the first mobile device at the subscription profile server, and
     wherein the updated data usage information is stored in a second portion of the profile of the first mobile device of the subscription profile server;
   receiving, at the session manager, a second request from a second mobile device to initiate a second communication session;
   retrieving, at the session manager, the updated data usage information associated with the first mobile device from the second portion of the profile of the first mobile device of the subscription profile server;
   receiving, at the session manager, a first notification from the gateway that the threshold associated with the data usage information has been met;
   providing, at the session manager, a second notification to the subscription profile server that the threshold associated with the data usage information has been met,
     wherein upon the subscription profile server receiving the second notification, the subscription profile server sends a billing request to a billing webpage requesting that an advertisement for an increased data usage allocation be presented to the mobile device, the increased data usage allocation being data usage that is in addition to the allocated data usage; and receiving, at the session manager, a third notification from the gateway that the data usage has been increased by the increased data usage allocation.

16. The media of claim 15, further comprising calculating adjusted data usage information based on the increased data usage allocation.

17. The media of claim 16, further comprising sending the adjusted data usage information to the subscription profile manager.

18. The media of claim 17, wherein the adjusted data usage information is stored by the subscription profile manager a profile associated with the mobile device.

\* \* \* \* \*